United States Patent
Nadel et al.

(10) Patent No.: US 10,806,162 B2
(45) Date of Patent: Oct. 20, 2020

(54) SYSTEM AND METHOD FOR PRODUCING AERATED FOOD PRODUCTS UNDER CONDITIONS REQUIRING A DECREASED ELECTRICAL AND THERMAL LOAD

(71) Applicant: STEUBEN FOODS, INC., Elma, NY (US)

(72) Inventors: Ira Allen Nadel, Getzville, NY (US); Ajay Kaul, Briarwood, NY (US)

(73) Assignee: STEUBEN FOODS, INC., Elma, NY (US)

( * ) Notice: Subject to any disclaimer, the term of this patent is extended or adjusted under 35 U.S.C. 154(b) by 749 days.

(21) Appl. No.: 15/405,530

(22) Filed: Jan. 13, 2017

(65) Prior Publication Data
US 2017/0119012 A1  May 4, 2017

Related U.S. Application Data

(62) Division of application No. 13/479,413, filed on May 24, 2012, now Pat. No. 9,591,864.

(51) Int. Cl.
| | | |
|---|---|---|
| *A23G 3/52* | (2006.01) | |
| *B01F 3/04* | (2006.01) | |
| *A23G 3/34* | (2006.01) | |
| *A23G 3/02* | (2006.01) | |
| *A23G 3/38* | (2006.01) | |
| *B01F 15/04* | (2006.01) | |
| *B01F 5/06* | (2006.01) | |

(52) U.S. Cl.
CPC .............. *A23G 3/52* (2013.01); *A23G 3/0012* (2013.01); *A23G 3/0221* (2013.01); *A23G 3/38* (2013.01); *B01F 3/04446* (2013.01); *B01F 3/04992* (2013.01); *B01F 15/0479* (2013.01); *A23V 2002/00* (2013.01); *B01F 5/0601* (2013.01); *B01F 2003/04921* (2013.01); *B01F 2215/0014* (2013.01)

(58) Field of Classification Search
CPC .................................. A23G 3/52; A23P 10/47
USPC .................................................... 426/89, 573
See application file for complete search history.

(56) References Cited

U.S. PATENT DOCUMENTS

| | | | | |
|---|---|---|---|---|
| 3,891,779 | A * | 6/1975 | Robinson | A23L 3/02 426/399 |
| 4,554,169 | A * | 11/1985 | Anderson | A23L 29/284 426/249 |
| 4,587,130 | A | 5/1986 | Stauber | |
| 4,952,413 | A * | 8/1990 | LaBarge | A23G 3/346 426/6 |
| 4,988,529 | A * | 1/1991 | Nakaya | A23G 9/045 426/565 |
| 5,939,126 | A | 8/1999 | Flynn | |
| 6,258,397 | B1 | 7/2001 | Flynn | |
| 6,481,468 | B1 * | 11/2002 | Taggart | B67C 7/0033 134/169 R |
| 6,503,553 | B1 | 1/2003 | Flynn | |
| 6,761,920 | B1 * | 7/2004 | Kaplan | A23C 3/033 426/399 |
| 6,783,790 | B1 | 8/2004 | Emsing et al. | |
| 2004/0071835 | A1 * | 4/2004 | Bartkowska | A23G 9/04 426/101 |
| 2004/0170751 | A1 * | 9/2004 | Roy | A23G 1/325 426/660 |
| 2007/0207232 | A1 | 9/2007 | Nelson et al. | |
| 2008/0075816 | A1 | 3/2008 | Jensen et al. | |
| 2009/0214729 | A1 | 8/2009 | Shimek | |
| 2010/0143545 | A1 * | 6/2010 | Mor | A23G 1/52 426/103 |
| 2010/0159088 | A1 | 6/2010 | Leshik et al. | |
| 2011/0318454 | A1 * | 12/2011 | Obrecht | A23L 2/38 426/46 |

OTHER PUBLICATIONS

Non Final Office Action for U.S. Appl. No. 13/479,413, filed May 24, 2012, dated Jan. 29, 2016.
Final Office Action for U.S. Appl. No. 13/479,413, filed May 24, 2012, dated Aug. 5, 2016.
Notice of Allowance for U.S. Appl. No. 13/479,413, filed May 24, 2012, dated Nov. 4, 2016.

* cited by examiner

*Primary Examiner* — Jyoti Chawla
(74) *Attorney, Agent, or Firm* — Schmeiser, Olsen & Watts, LLP

(57) ABSTRACT

A system for creating an aerated food product, whereby a decreased electrical and thermal load may be obtained is disclosed. Furthermore, a method of producing an aerated food product comprising the steps of separately preparing a first food product portion and a second food product portion, transferring the first food product portion to a first aseptic surge tank, transferring the second food product portion to a second aseptic surge tank, mixing a combination of the first food product portion and the second food product portion to create a mixed food product, aerating the mixed food product to create the aerated food product, and dispensing the aerated food product from a filling apparatus into a container is also disclosed. An aerated food product is also disclosed.

9 Claims, 3 Drawing Sheets

SYSTEM AND METHOD FOR PRODUCING AERATED FOOD PRODUCTS UNDER CONDITIONS REQUIRING A DECREASED ELECTRICAL AND THERMAL LOAD

CROSS-REFERENCE TO RELATED APPLICATIONS

This application is a divisional application of U.S. application Ser. No. 13/479,413, filed May 24, 2012, and entitled, "A System and Method for Producing Aerated Food Products Under Conditions Requiring a Decreased Electrical and Thermal Load."

FIELD OF TECHNOLOGY

The present application generally relates to a food product and more particularly relates to a method for creating an aerated food product which may utilize a smaller thermal and electrical load upon the equipment used in the production process.

BACKGROUND

Conventional food preparation methods of commercially produced aerated food products may typically be created by combining all of the ingredients together, followed by heat treating and homogenization, then cooling the product prior to aerating it. One of the potential drawbacks of this method is the large amount of electrical and thermal load which may be necessary to process the resulting food product prior to aerating it because it may be more viscous in nature, therefore requiring more energy to move the product through the necessary machinery. As a response to these limitations, the method described herein discloses how to reduce the electrical and thermal load necessary to process and create aerated food products, particularly demonstrated using an aerated Mousse as an example. Through the separation of the Mousse base ingredients and the gelatin solution into less viscous counterparts at cooler temperatures, a decreased electrical and thermal load may be needed to process the separate components at the desired temperature prior to combining and aerating them. It is desirable to reduce electrical and thermal loads because some manufacturing plants may be incapable of supporting conventional processing methods. Some manufacturers may realize cost savings by decreasing energy expenditure, and some manufacturers may be incapable of affording the necessary equipment to use traditional commercial methods.

Thus, a need exists for an apparatus and method capable of creating an aerated food product, system, and method under conditions that may be unable to support the conventional commercial production apparatuses and methods.

SUMMARY

A first general aspect relates to a system for creating an aerated food product, whereby a decreased electrical and thermal load may be obtained, the system comprising a first aseptic surge tank configured to receive a first food product portion, a second aseptic surge tank configured to receive a second food product portion, a mixer connected to the first aseptic surge tank and the second aseptic surge tank, the mixer configured to mix the first food product portion and the second food product portion to create a mixed food product, and an aerator connected to the mixer, the aerator configured to aerate the mixed food product to create the aerated food product.

A second general aspect relates generally to a method of producing an aerated food product comprising the steps of separately preparing a first food product portion and a second food product portion, transferring the first food product portion to a first aseptic surge tank, transferring the second food product portion to a second aseptic surge tank, mixing a combination of the first food product portion and the second food product portion to create a mixed food product, aerating the mixed food product to create the aerated food product, and dispensing the aerated food product from a filling apparatus into a container. By separating the first food product portion from the second food product portion, a decreased electrical and thermal load may be achieved because a combined food product may be much more viscous than separated portions blended at a later processing stage. A viscous food product may require greater pump energy to move the product and increased motor loads. Conversely, a separated food product may be much less viscous therefore decreasing pump energy and motor loads may be needed to move product or process the product.

A third general aspect relates generally to an aerated food product comprising a first food product portion; and a second food product portion, wherein the first food product portion and the second food portion are separately aseptically prepared and combined in a mixer, and aerated to create the aerated food product.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Throughout the specification, references to percentages are by weight and temperatures are in degrees Fahrenheit unless otherwise indicated.

Figure 1:
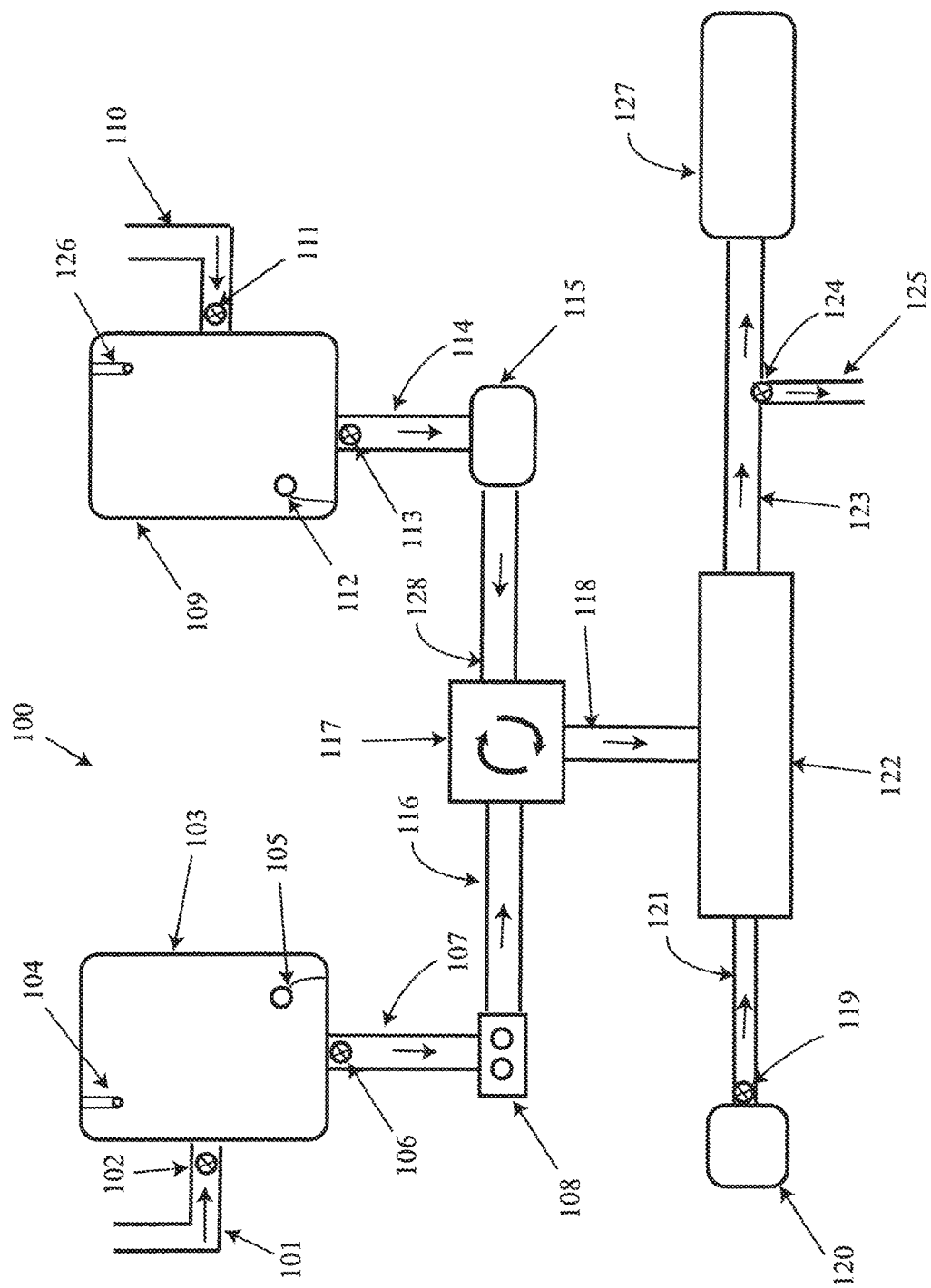
FIG. 1 depicts a schematic view of an embodiment of a system for creating an aerated food product which requires a decreased electrical and thermal load.

FIG. 1. depicts a system 100 for creating an aerated food product, whereby a decreased electrical and thermal cooling load may be obtained. Embodiments of system 100 may include a first surge tank 103, a second surge tank 109, a mixer 117, an aerator 122, and a filling apparatus 127. Further embodiments of system 100 may include a first surge tank 103 configured to contain a first food product portion, a second surge tank 109 configured to contain a second food product portion, a mixer 117 connected to the first surge tank 103 and the second surge tank 109, the mixer 117 configured to mix the first food product portion and the second food product portion to create a mixed food product, an aerator 122 connected to the mixer 117, the aerator 122 configured to aerate the mixed food product to create an aerated food product, and a filling apparatus 127 connected to the aerator 122, the filling apparatus configured to receive the aerated food product from the aerator 122 and insert the aerated food product into a package or container. Embodiments of the aerated food product may be the final food product inserted into packages and containers for distribution and consumption. Moreover, the first food product portion may be a mousse base and the second food product portion may be a gelatin solution, described in greater detail infra.

System 100 may achieve the decreased electrical and thermal load by separating portions of matter desired to be combined into a plurality of surge tanks, such as a first surge tank 103 and a second surge tank 109. By separating the first food product portion from the second food product portion, a decreased electrical and thermal load may be achieved because a combined food product may be much more viscous than separate components blended at a later processing stage. A viscous food product, once cooled may require greater pump energy to move the food product and increased motor loads, typically requiring a larger powered pump to work with the highly viscous products. Conversely, separating a food product into first and second food product portions may be much less viscous therefore decreasing pump energy and motor loads may be needed to move product or process the product. Discharge from a surge tank for low viscous products is typically accomplished by pressurizing the vessel. Separation is not limited to two surge tanks, for example, there may be any number of surge tanks used for containing materials desired to be combined into a final product. Embodiments of the first surge tank 103 and the second surge tank 109 may be pressurized aseptic surge tanks promoting a sterile environment within the tank and capable of being in contact with food product(s). Surge tanks 103, 109 (sometimes referred to as "surge drum") may be used to regulate one or more fluid levels in the system 100. Regulation of fluids entering through the first surge tank inlet 101 and the second surge tank inlet 110 may be regulated by varying the flow rate from the thermal processors upstream of first intake valve 102 and a second intake valve 111. Intake valves 102, 111 may be a flow regulator, flow controller, or similar device that can be used as a means for regulating the flow of fluid in which the flow rate may be user controlled. Surge tanks 103, 109 may act as storage reservoir which supplies excess fluid when necessary to the rest of the system 100. Surge tanks 103, 109 may have the ability to modify flow rate through a first output valve 106 operably associated with the first surge tank 103 and a second output valve 113 operably associated with the second surge tank 109. The output valves 106, 113 may be a flow regulator, flow controller, or similar device that can be used as a means of controlling fluid output, which may be user controlled. The first and second surge tanks 103, 109 may also be connected to a first pump 108 and a second pump 115, respectively. The pumps 108, 115 may propel the contents of the first and second surge tanks 103, 109 to a desired location at a desired rate by varying the speed of pumps 108 and 115; these may be relatively small powered pumps compared to pumps used under conventional processing methods. Pumps 108 and 115 may be non-slip pumps so as not to interfere with the controls of the aeration device 122. Embodiments of pump 108, 115 may vary depending on the contents of the surge tanks 103,109. For instance, the first pump 108 may be a rotary lobe pump used when the contents of the first surge tank 103 contain thick viscous materials, solids, semi solids or slurries. Embodiments of the second pump 115 may be a progressive cavity pump 115 used when the second surge tank 109 contains liquids or compounds in solution. Those having skill in the requisite art should understand that system 100 is not restricted to these particular pumps, and any pump capable of being connected to a surge tank may be used.

Referring still to FIG. 1, the first and second surge tanks 103, 109 may also control temperature. Embodiments of the first and second surge tanks 103, 109 may be outfitted with a means to increase or decrease the temperature inside them. These temperatures may be regulated and monitored by a first thermostat 105 operably associated with the first surge tank 103 and a second thermostat 112 operably associated with the second surge tank 109. Embodiments of system 100 may include more than one thermostat operably associated with the first or second surge tank 103, 109. Heat treatment may occur separately prior to transferring the contents to the surge tanks, or temperature control within the surge tanks, such as the first surge tank 103 and the second surge tank 109, may also be used to heat treat the contents of the surge tanks. Heat treatment can be a process by which food is sterilized at extremely high temperatures, for example, around 275° F. or greater for approximately a few seconds, but may be longer as necessary to ensure the sterilization is properly complete. Sterilization times may vary depending upon the quantity and type of food product prepared. This process may also be referred to as ultra-high temperature processing or ultra-heat treatment. The result of this heat treatment process is a food product safely sterilized for consumption, preventing the growth of pathogenic and non-pathogenic bacteria such as *E. coli* and Clostridium.

Moreover, embodiments of the first surge tank 103 and the second surge tank 109 may include a means to control pressure within the tanks 103, 109. Pressure within the first tank 103 may be controlled by an external sterile air supply (not shown in FIG. 1). Pressure inside the surge tanks 103, 109 may be monitored by a first pressure sensor 104 operably associated with the first surge tank 103 and a second pressure sensor 126 operably associated with the second surge tank 109. By controlling the speed of pumps 108 and 115 from surge tanks 103 and 109, multiple parts of a food product may be mixed in precise, metered proportions as desired by the preparer of the food product.

With continued reference to FIG. 1, embodiments of system 100 may include a mixer 117 operably connected to the first surge tank 103 and the second surge tank 109. Embodiments of the first surge tank 103 may be in fluid communication with the mixer 117 through physical connection of the first output 107 of the first surge tank 103 and the first intake 116 of the mixer 117. Similarly, the second surge tank 109 may be in fluid communication with the mixer 117 through the physical connection of the second output 114 of the second surge tank 109 and the second intake 128 of the mixer 117. Those skilled in the art should appreciate that although the first and second surge tanks 103, 109 are in fluid communication with the mixer 117, solids, semi-solids, and the like, may pass through the surge tanks 103, 109 to the mixer 117 through the intakes and outputs of the surge tanks 103, 109 and the mixer 117. Embodiments of the mixer 117 may achieve proper mixing of a first food product portion and a second food product portion to form a mixed food product. However, the mixer 117 may receive more than two food product portions, such as a plurality of food product portions received by the mixer 117 from a plurality of surge tanks. The food product portions may be portions of food product, such as a mousse base and a gelatin solution, or any food contents suitable for mixing. Furthermore, the mixer 117 may have multiple intake ports, such as the first and second intake ports 116, 128, but may include two or more intake ports operably connected to a surge tank forming part of the plurality of surge tanks beyond the first surge tank 103 and the second surge tank 109. Because the mixer 117 may include at least two independent flow rates received by intake ports 116, 128 of mixer 117, various proportions of materials, food product portions, etc. can be combined from multiple surge tanks (e.g. first surge tank 103 and second surge tank 109). Embodiments of the mixer 117 may be any mixer capable of interfacing with a surge tank or surge tank pump.

A means for combining surge tank streams in metered proportions may include equipping each surge tank 103, 109 with outputs 107, 111, which may be a pipe, tubing, hoses or other commonly known methods for displacing fluid or semi-solids within a controlled fashion, through the use of valves 106 and 113 and/or pumps, such as a rotary lobe pump 108 or a progressive cavity pump 115. The streams can be combined by linking the surge tank pipes, tubing, hoses or other known fluid displacement methods into a common location capable of holding the contents of both surge tank streams, such as mixer 117. Alternatively, if mixing is not required, the contents of the surge tanks may flow directly into an aerator 122 or any other container capable of holding the desired contents.

Once the contents of the first and second surge tanks 103, 109 have been combined, the contents of the mixer 117 may then be expelled via the mixer's output means 118. The output means 118 for a mixer may be any means capable of displacing the contents of the mixer to a desired location. For instance, the output means 118 may be piping, tubing, and the like, physically connecting the mixer 117 and the aerator 122. These means may be similar to the means through which the surge tanks 103, 109 expel their contents. The contents of the mixer 117 may be expelled into an aerator 122.

Referring still to FIG. 1, embodiments of the system 100 may include an aerator 122 operably connected to the mixer 117. Embodiments of the aerator 122 may receive the mixed food product formed by the mixing of the first food product portion and the second food product portion in the mixer 117. The aerator 122 can aerate the expelled contents (e.g. the mixed food product) of the mixer 117 by pumping the expelled contents of the mixer 117 with gaseous molecules, which are absorbed by the expelled contents. Embodiments of the aerator 122 may aerate the received mixed food product using an aerator fluid, such as a gas, air, Oxygen, Nitrogen, or Carbon Dioxide; however any suitable gaseous molecule known to be safe or acceptable under governmental regulations in the use of food aeration may be used. The aerator fluid may be formed and distributed to the aerator 122 through an aerator fluid generator 120, wherein the aerator fluid generator 120 is operably connected to the aerator 120 such that they are in fluid communication, and physically connected by at least one pipe, tube, hose, etc, such as exhaust output 121. Embodiments of the aerator fluid generator 120 may be a micro-filtered gas producing generator or any other means for creating and distributing an aerator fluid/gas to an aerator 122. The amount of aerator fluid distributed to the aerator 122 may be controlled by an output valve 119 or any other means controlling the distribution and amount of aerator fluid used in a controlled manner. The aerator gas, once released may be directed into the aerator 122 through any known means of controlling the flow of gas, such as connecting pipes, tubing or hoses from the aerator fluid generator's 120 exhaust output 121 to the aerator 122. Accordingly, the aerator 120 is configured to aerate the mixed food product to form an aerated food product, once the mixed product has been aerated by the aerator 120 to the desired amount.

The amount of aeration of the mixed product located within the aerator 120 may be referred to as "percent overrun." Percent overrun may be calculated by ((unaerated base weight−final aerated weight)/final aerated weight)× 100. For example an aerated product (e.g. final food product) containing an unaerated base weight of 115 g and a final aerated weight of 65 g will have a percent overrun of ((115−65)/65)×100=77%. Additionally, the percent overrun may have a variation of approximately 20%.

Embodiments of system 100 may further include a filling apparatus 127 connected to the aerator 122, the filling apparatus configured to receive the aerated food product from the aerator 122 and insert the aerated food product into a package or container. Embodiments of the aerated food product may be the final food product inserted into packages and containers for distribution and consumption. Specifically, once the aerated food product has reached a desired percent overrun, the aerated food product can be transferred to the filling apparatus 127 via an aerator output connection 123, which connects the aerator 122 to the filling apparatus 127 maintains fluid communication therebetween. Embodiments of the aerator output connection 123 may include a purge valve 124, or any other known means for a user to bleed a system. A purge valve, such as purge valve 124 may be used to bleed the system of contents (e.g. the food product(s)) prior to reaching the filling apparatus 127. Furthermore, embodiments of system 100 may have any multiple numbers of purge valves along its path and in various locations. A purge valve, such as purge 124, allows the user access to the contents of the system 100 at a point prior to the system's completion proximate the filling apparatus 124.

Embodiments of the filling apparatus 124 may be a machine capable of inserting food products, such as the aerated food product transferred from the aerator 122, into packaging or containers. For example, embodiments of the filling apparatus 127 may be a Hamba Filler, Hamba Cup Filler, and the like. Furthermore, embodiments of the filling apparatus 127 may be able to sterilize and seal the packaging and/or containers receiving the aerated food product, or other final food product. The packaging and/or containers may be composed of any known plastic, Styrofoam, glass, porcelain, cardboard or any other known packaging material formulations used in the food industry. Packaging or containers can come in various shapes, volumes, designs, and sizes depending on various needs. For example, the packaging and/or container receiving the aerated food product, or other final food product, can be a 4 oz. individual portion cup. Moreover, embodiments of the packaging and/or containers may be sealed with a "heat seal." Heat seals may be defined as a method for enclosing products in wrapping or packaging wherein an airtight seal is created by applying an external amount of energy such as heat to melt the sealant, followed by applying pressure to fuse the edges of the wrapping together. Heat seals may include, but are not limited to, such examples constructed out of aluminum or plastics.

Figure 2:
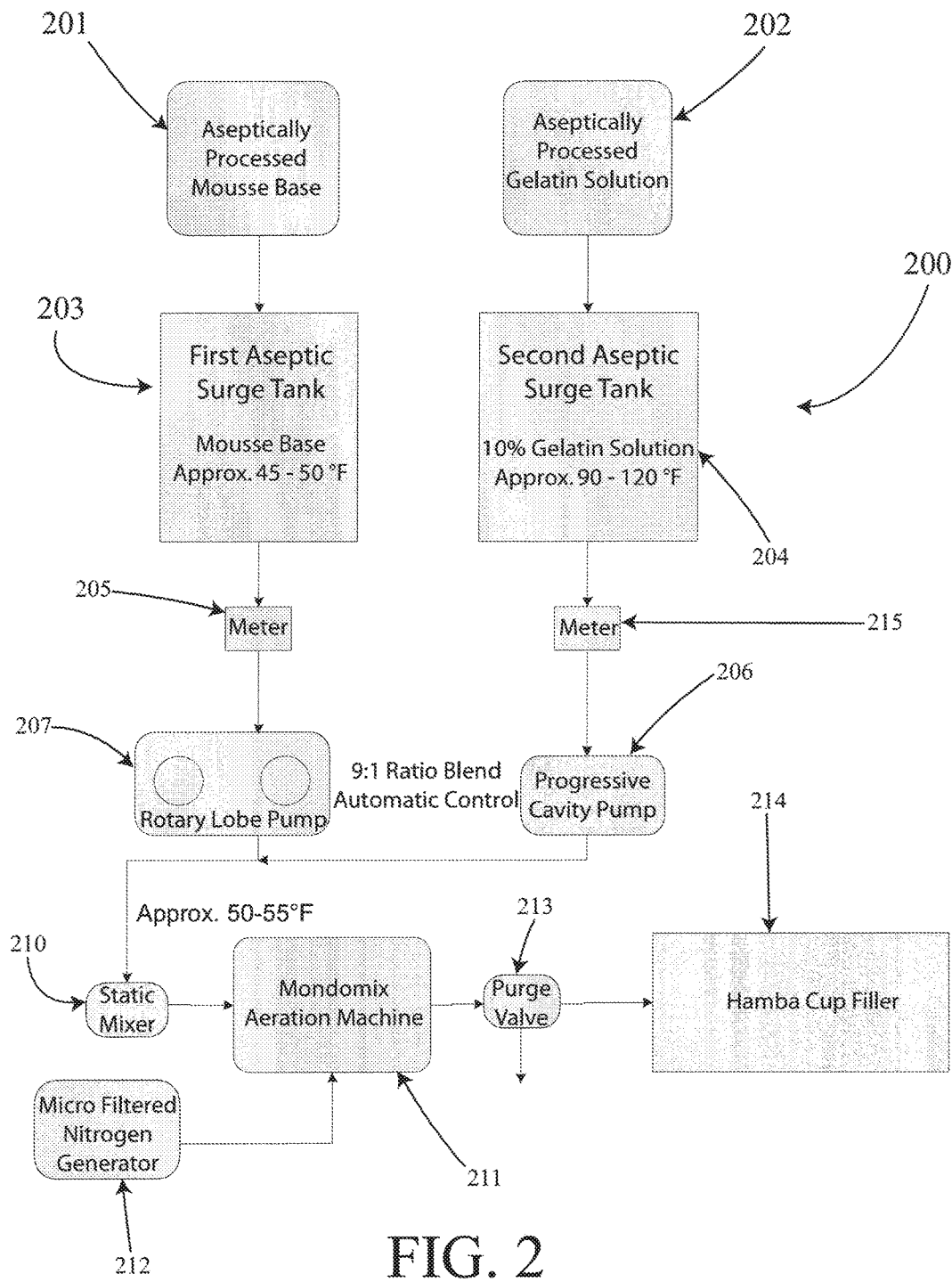
FIG. 2 depicts a schematic view of an embodiment of a method combining a Mousse base and gelatin solution in metered proportions to create an aerated mousse product.
Figure 3:
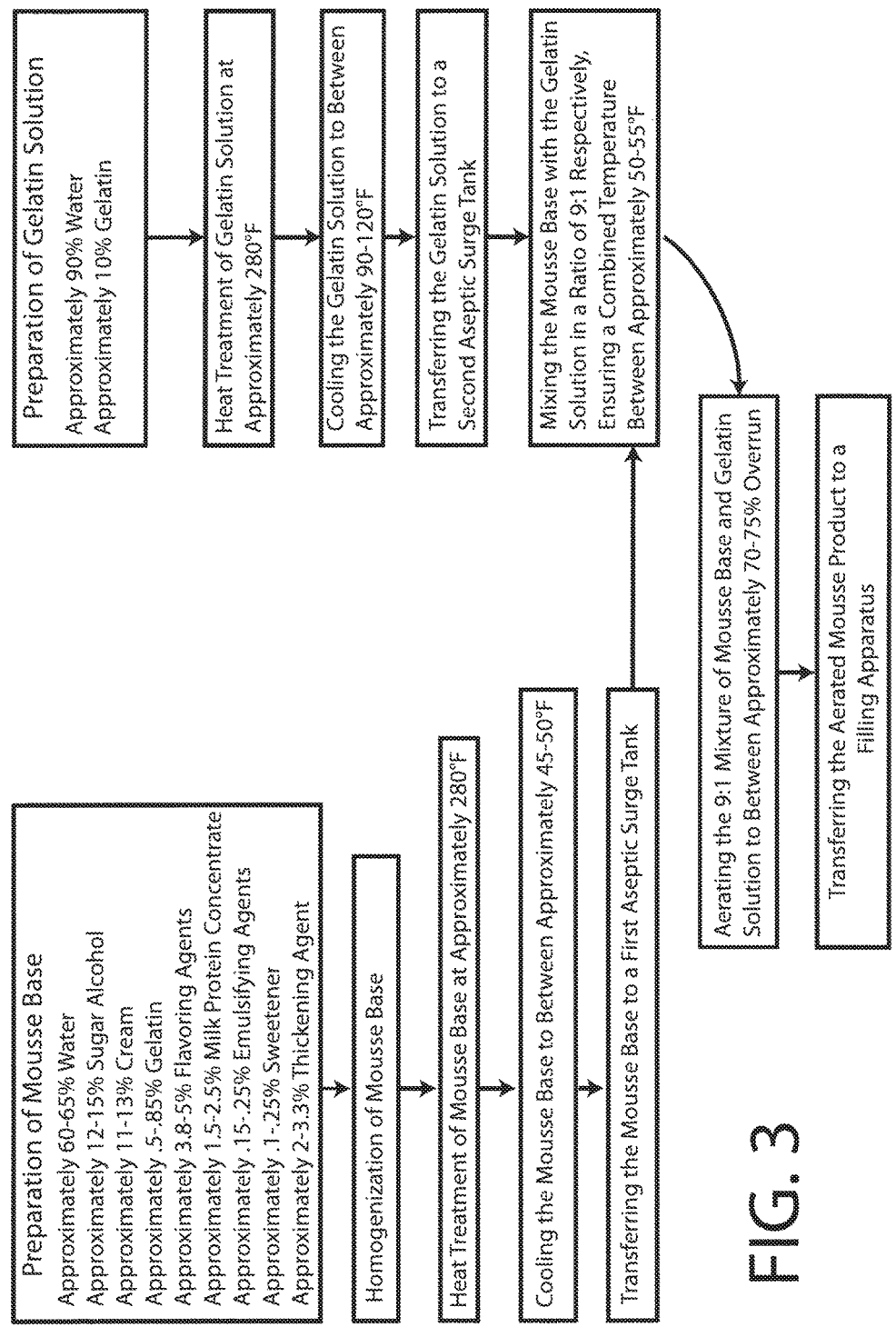
FIG. 3 depicts a flow chart of a method for creating an aerated mousse product.

Referring still to the drawings, FIGS. 2 and 3 depict an embodiment of a method 200 for producing aerated food products under conditions requiring a decreased electrical and thermal load. Embodiments of method 200 may include the steps of combining a Mousse base and gelatin solution in metered proportions to create an aerated food product using the system 100 described in association with FIG. 1. Further embodiments of method 200 may include the steps of separately preparing a first food product portion and a second food product portion, transferring the first food product portion to a first aseptic surge tank, transferring the second food product portion to a second aseptic surge tank, combining the first food product portion and the second food product portion into a mixer, wherein the first food product portion and the second food product portion is mixed to form a mixed food product, transferring the mixed food product to an aerator, aerating the mixed food product to form an aerated food product, transferring the aerated food product to a filling apparatus, and dispensing the aerated food product from the filling apparatus into a container. By separating the Mousse base from the gelatin solution a decreased electrical and thermal load may be required because a combined product may be much more viscous than separate components blended at later processing stage. A viscous product may require greater pump energy to move the product and increased motor loads. Conversely, a separated product may be much less viscous therefore decreasing pump energy and motor loads may be needed to move product or process the product. The step of separately preparing the first food product portion and the second food product portion may include the steps of homogenizing the first food product portion and the second food product portion, heat treating the first food product portion and the second food product portion, cooling the first food product portion and the second food product portion. The steps of heat treating and homogenizing may be dependent upon the contents of each food product portion, laws and regulation requirements for food preparation as well as personal preferences of the food portion preparer. Heat treating and homogenizing are independent processes and the inclusion of heat treating may not automatically include homogenizing a first or second food portion and vice versa. Additional embodiments may include forgoing heat treating or homogenizing steps altogether.

Embodiments of method 200 may include the step of separately aseptically processing/preparing a first food product portion and a second food product portion. In one embodiment, the first food product portion is a mousse base 201, and the second food product portion is a gelatin solution.

Embodiments of the mousse base 201 may be a combination of ingredients which may form a mixture capable of being emulsified and aerated. The ingredients may include water, sweetener, sugar alcohol, gelatin, cream, thickening agents, salt, milk protein concentrate, emulsifying agents and flavoring agents. The mousse base 201 may include all of the listed ingredients, but all of the ingredients may not be required in the Mousse base 201, as the desired taste and consistency may be based upon personal preferences. Embodiments of the gelatin solution 202 may include a solution of a solvent and gelatin. Further embodiments of the gelatin solution 202 may refer to a process of dissolving a gelatin solute into a solvent whereby a solution is formed. Any solvent capable of dissolving gelatin that is safe for human consumption may be used. In an exemplary embodiment, the gelatin solution 202 comprises approximately 90% water and approximately 10% gelatin.

Embodiments of a sweetener may refer to any sugar, either real or artificially synthesized which may be used within in food products and is capable of increasing the sweetness of the food product. For example, the sweetener may include, but are not limited to Sucrose, Sucralose, Aspartame, Acesulfame-K, Tagatose and Saccharin.

Embodiments of a sugar alcohol may be defined as a hydrogenated form of the carbohydrate sugar wherein the carbonyl group has been reduced to a hydroxyl group. Sugar alcohols may be used in combination with sweeteners. For example, the sugar alcohol may be used interchangeably or in combination with each other, and may include examples such as Sorbitol, Malitol, Glycerol, Xylitol, Glycol, Mannitol, Lactitol, Arabitol, or any other known sugar alcohol.

Embodiments of gelatin may be defined as a mixture of peptides and proteins produced by partial hydrolysis of collagen extracted from the boiled bones, connective tissues, organs and/or some intestines of animals such as cattle, and horses. It may be used as a gelling agent in food. Kosher gelatin may be substituted for any gelatin that does not meet kosher standards. Kosher gelatin may be derived from fish or cows rather than being derived from pig sources. In addition, kosher gelatin-like products may also be substituted. Gelatin-like products refer to substances with a similar chemical behavior which may include food starch from tapioca, chemically modified pectin, and carrageenan combined with vegetable based gums.

Embodiments of a thickening agent may be defined as any substances which increase the viscosity of a solution or liquid/solid mixture without substantially modifying its other properties. Thickening agents may be used in emulsions to improve the structural stability of the product. For example, the thickening agent may include, but is not limited to polysaccharides such as starches, gums, and pectin or proteins such as collagen, egg whites, and gelatin.

Embodiments of an emulsifying agent may be defined as substances that are soluble in both fat and water and enable fat to be uniformly dispersed in water as an emulsion, wherein an emulsion may be defined as a mixture of two or more immiscible liquids. A common example within the food industry is an oil and water emulsion. For example, the emulsifying agent may include, but is not limited to Sodium Stearol Lactylate or other fatty acid derivatives such as polyglycerol esters, propylene glycol esters, sucrose esters, sorbitan esters and polysorbates. Additionally other emulsifiers may include lechtin, honey, mustard, monoglycerides, and diglycerides.

Embodiments of a flavoring agent(s) may be a substance that gives another substance flavor, altering the characteristics of the solute, causing it to become sweet, sour, tangy, spicy, bitter, and salty or any combination thereof. The act of altering flavor of another substance may be conducted by modifying the taste or the smell of the product. For example, the flavoring agent(s) used in aerated food products may include, but are not limited to, cocoa, dark chocolate, white chocolate, strawberry, vanilla, raspberry, lemon, lime, cappuccino, coffee, peach, caramel or any other commonly known flavoring agent. Flavoring agents may come in many formulations and variations, natural or synthesized. Any known variation of cocoa, dark chocolate, white chocolate, strawberry, vanilla, raspberry, lemon, lime, cappuccino, coffee, peach, and caramel could be used when synthesizing a flavored aerated Mousse product. The resulting flavor is a matter of personal preference and any possible variation could be used. In an exemplary embodiment, the flavoring agent is De Zaan D-11-S.

Embodiments of a solution may be a homogeneous mixture composed of only one phase. In a homogeneous mixture, a solute is the substance being dissolved and the substance conducting the dissolution is known as the solvent.

Referring again to FIGS. 2 and 3, embodiments of separately aseptically preparing the first food product portion and the second food product portion may include the step of homogenizing the first food product portion, such as the mousse base 201. Embodiments of the second food product portion, such as a gelatin solution, may be homogenized; however, in at least one exemplary embodiment, the gelatin solution 202 is not homogenized. Various homogenizing methods known to those having skill in the requisite art may be employed to blend or mix mutually related substances to form a constant or uniform mixture.

Additionally, embodiments of separately aseptically preparing the first food product portion and the second food product portion may include the step of heat treating the first food product portion and the second food product portion. In embodiments where the first food product portion is a mousse base 201, the mousse base 201 can be heat treated at approximately 280° F. In embodiments where the second food product portion is a gelatin solution 202, the gelatin solution 202 can be heat treated at approximately 280° F.

Embodiments of separately aseptically preparing the first food product portion and the second food product portion may include the step of cooling the first food product portion and the second portion. In embodiments where the first food product portion is a mousse base 201, the mousse base 201 can be cooled at approximately 45-50° F. In embodiments where the second food product portion is a gelatin solution 202, the gelatin solution 202 can be cooled at approximately 90-120° F.

With continued reference to FIGS. 2 and 3, embodiments of method 200 may include the step of transferring the first food product portion to a first aseptic surge tank 203, transferring the second food product portion to a second aseptic surge tank 204. For instance, once the mousse base 201 and gelatin solution 202 have been aseptically prepared/processed, the mousse base 201 may be transferred to a first aseptic surge tank 203, and the gelatin solution is transferred to a second aseptic surge tank 204. Embodiments of the first and second aseptic surge tanks 203, 204 may share the same or substantially the same structural and functional aspects as tanks 103, 109 described above. Transferring the Mousse base 201 to a first aseptic surge tank 203 and transferring the gelatin solution 202 to a second aseptic surge tank 204 may be conducted in any manner commonly known in the art capable of transporting a state of matter, such as food products, from one location to a desired destination. The viscosity of the Mousse base and gelatin solution may be approximately 5,000 centipoise (cP) and 3 cP respectively, as compared to a viscosity of approximately 30,000 cP if the Mousse base and gelatin solution were processed together by the conventional method. As depicted in FIG. 1, food product(s) or other matter desired for storage in a surge tank may be fed through a first surge tank inlet 101 and a second surge tank inlet 110. Embodiments of inlets 101, 110 may contain piping, tubing, or hoses through which the food separately aseptically prepared food products portions are fed into the tanks 203, 204. Additionally the inlets 101, 110 may contain a funnel and/or opening capable of receiving said matter desired for storage in the surge tanks 203, 204. Embodiments of an aseptic surge tank, such as tanks 203, 204 may contain all the properties of a surge tank, while additionally maintaining food sterility while the food products are held within the surge tanks. Accordingly, the mousse base 201 may be stored in a first separate surge tank between approximately 45-50° F., prior to transferring to the first aseptic surge tank 203. The separate surge tank may have all the properties of surge tanks 103 and 109 described above. Similarly, the gelatin solution 202 may be stored in the second separate surge tank between approximately 90-120° F. The second separate surge tank may have all the properties of tanks 103 and 109.

Furthermore, embodiments of method 200 may include the step of combining the first food product portion and the second food product portion into a mixer 210, wherein the first food product portion and the second food product portion is mixed to form a mixed food product. Embodiments of the mixer 210 may share the same or substantially the same structural and functional aspects as the mixer 17 described above. For instance, from the first aseptic surge tank 203, the mouse base 201 can be metered out by a first metering device 205 to a desired proportion by controlling the flow rate from the first aseptic surge tank 203 through the means of a first pump 207, such as a rotary lobe pump, which feeds the contents of the first aseptic surge tank 203 into the mixer 210 in a controlled fashion. Embodiments of the mixer 210 may be a static mixer. At the same time, or at a time reasonably close to the transfer of the mousse base 201 from the first aseptic surge tank 203 to the static mixer 210, the gelatin solution 202 contained within the second aseptic surge tank 204 may be transferred in a controlled fashion to the mixer 210. The gelatin solution 202 may be metered out by a second metering device 215 through the use of a second pump 206, such as a progressive cavity pump, which can be user controlled to moderate a flow to the mixer 210. In an exemplary blend of the first food product portion and the second food product portion in the mixer 210 is a blend of mousse base 201 to gelatin solution 202 is in the ratio of 9:1. An exemplary temperature of the food product portions within the mixer 210 is between approximately 50-55° F. Once the mixer 210 thoroughly mixes the contents of the first and second aseptic surge tanks 203, 204, the resultant food product may be referred to as a mixed food product.

Embodiments of method 200 may further include the step of transferring the mixed food product to an aerator 211 and aerating the mixed food product to form an aerated food product. Embodiments of the aerator 211 may share the same or substantially the same structural and functional aspects of the aerator 122 described above. Embodiments of the aerator may include a Mondomix Aeration machine. The aerator 211 subsequently aerates the mixed food product received from the mixer 210 using an aerator fluid, such as nitrogen gas supplied by a micro-filtered nitrogen generator 212. The nitrogen can be supplied in a controlled fashion to the aerator 211 until the mixed food product within the aerator 211 are aerated to approximately 70% overrun. The resultant food product after achieving a target percent overrun may be referred to as the aerated food product.

Referring still to FIGS. 2 and 3, embodiments of method 200 may include the step of transferring the aerated food product to a filling apparatus 214, and dispensing the aerated food product from the filling apparatus 214 into a container. Embodiments of the filling apparatus 214 may share the same or substantially the same structural and functional aspects of the filling apparatus 127 described above; the filling apparatus 214 may be a Hamba Filler or Hamba Cup Filler. Once the proper or target amount of aeration is achieved, the aerated food product may be sent to the filling apparatus 214 where the aerated food product can be dispensed, filled, injected, etc., into a package or container, such as a portion cup capable of being sealed by a heat seal. In an exemplary embodiment, the aerated food product dispensed into the container by the filling apparatus 214 is an aerated mousse. The aerated mousse can be configured to be provided to a consumer in an individual-sized portion.

With reference now to FIGS. 1-3, an aerated food product may comprise a first food product portion and a second food product portion, wherein the first food product portion and the second food portion are separately aseptically prepared, mixed, and aerated to create the aerated food product. The first food product portion may be a mousse base, wherein the mousse base may contain approximately 60-65% water, 12-15% sugar alcohol, 11-13% cream, 0.5-0.85% gelatin, 3.8-5% Cocoa, 1.5-2.5% milk protein concentrate, 0.15-0.25% emulsifying agents, less than 1% flavoring agents, 0.1-0.25% sweetener, and 2-3.3% thickening agent. The second food product portion may be a gelatin solution, wherein the gelatin solution may contain approximately 10% gelatin, and 90% water. The mousse base may be separately homogenized and subsequently heat treated at approximately 280° F. The gelatin solution may separately heat treated at approximately 280° F. Homogenization may be defined as a process by which a chemical substance becomes uniformly the same throughout. When working with a product containing both fats and water soluble ingredients, such as the Mousse base, homogenization may prefer the formation of an emulsion, in such a manner that the fats are broken down into tiny droplets such that they no longer appear separated from the rest of the ingredients. Upon the conclusion of the heat treatment, the mousse base is allowed to cool to approximately 45-50° F. and may be stored at this temperature prior to transfer to a surge tank. Additionally, at the completion of the heat treatment phase, the gelatin solution is cooled to approximately 90-120° F. The Mousse base and gelatin solution are then sent to their appropriate first and second surge tanks respectively. The viscosity of the mousse base and gelatin solution may be approximately 5,000 centipoise (cP) and 3 cP respectively, as compared to a viscosity of approximately 30,000 cP if the Mousse base and gelatin solution were processed together by the conventional method. A more viscous product might require greater pump energy to move the product. Additional motor loads may be required in the scraper barrels, to move the equivalent amount of product using a conventional method versus the ratio-blending method of this application. From the first and second surge tanks, the mouse base and gelatin solution are transferred to a mixer in the ratio of approximately 9 parts mousse base to 1 part gelatin solution. Upon mixing, the temperature of the combined Mousse base and gelatin solution mixture should be approximately 50-55° F. Upon the conclusion of mixing, the mixture is sent to an aerator wherein the newly combined mousse base and gelatin solution are aerated, preferably with nitrogen to approximately 70-75% overrun. Once the appropriate aeration is complete, the aerated food product is created, and may then be sent to a filling apparatus to be packaged and sealed.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims. The claims provide the scope of the coverage of the invention and should not be limited to the specific examples provided herein.

What is claimed is:

1. A method of producing an aseptically prepared aerated food product comprising:
   separately preparing an aseptic first food product portion and an aseptic second food product portion;
   metering out, by a first metering device, a portion of the aseptic first food product portion stored in a first aseptic surge tank towards a mixer, wherein a first pump is operably connected to the first aseptic surge tank;
   metering out, by a second metering device, a portion of the aseptic second food product portion stored in a second aseptic surge tank towards the mixer, wherein a second pump is operably connected to the second aseptic surge tank;
   mixing, by the mixer, a combination of the aseptic first food product portion and the aseptic second food product portion to create a mixed food product;
   aerating the mixed food product to create the aseptically prepared aerated food product; and
   heating the aseptic first food product portion and the aseptic second food product portion to maintain a lower viscosity of the aseptic first food product portion and the aseptic second food product portion resulting in a decreased electrical and thermal load;
   wherein the aseptic first food portion is separated from the aseptic second food product portion to maintain the lower viscosity within the first aseptic surge tank and the second aseptic surge tank, resulting in the decreased electrical and thermal load;
   wherein a first temperature of the aseptic first food product portion is monitored and controlled within the first aseptic surge tank and a second temperature of the aseptic second food product portion is monitored and controlled within the second aseptic surge tank to maintain the lower viscosity of the aseptic first food product portion and the aseptic second food product portion within the first aseptic surge tank and the second aseptic surge tank, resulting in the decreased electrical and thermal load.

2. The method of claim 1, further comprising an additional step of:
   dispensing the aseptically prepared aerated food product from a filling apparatus into a container; and
   sealing the container with a heat seal.

3. The method of claim 1, wherein separately preparing the aseptic first food product portion and the aseptic second food product portion includes:
   homogenizing at least one of the aseptic first food product portion and the aseptic second food product portion;
   heat treating at least one of the aseptic first food product portion and the aseptic second food product portion; and
   cooling the aseptic first food product portion and the aseptic second food product portion.

4. The method of claim 1, wherein the aseptic first food product portion is a mousse base, and the aseptic second food product portion is a gelatin solution.

5. The method of claim 3, wherein the aseptic first food product portion is stored in a first separate surge tank at less than approximately 50° F. prior to homogenizing and heat treating, and the aseptic second food product portion is stored in a second separate surge tank at approximately 90 to 120° F. prior to homogenizing and heat treating.

6. The method of claim 3, wherein homogenizing and heat treating at least one of the first food product portion and the second food product portion is at approximately 280° F. or greater.

7. The method of claim 1, wherein a target ratio of the aseptic first food product portion to the aseptic second food product portion is 9:1.

8. The method of claim 1, wherein a target aeration of the aseptically prepared aerated food product is approximately 70-75% overrun.

9. A method of producing an aseptically prepared aerated food product comprising:
- separately preparing an aseptic first food product portion and an aseptic second food product portion;
- transferring a portion of the aseptic first food product portion stored in a first aseptic surge tank;
- transferring a portion of the aseptic second food product portion stored in a second aseptic surge tank;
- mixing, by the mixer, a combination of the aseptic first food product portion and the aseptic second food product portion to create a mixed food product;
- aerating the mixed food product to create the aseptically prepared aerated food product; and
- heating the aseptic first food product portion and the aseptic second food product portion to maintain a lower viscosity of the aseptic first food product portion and the aseptic second food product portion resulting in a decreased electrical and thermal load;
- wherein the aseptic first food portion is separated from the aseptic second food portion to maintain the lower viscosity within the first aseptic surge tank and the second aseptic surge tank, resulting in the decreased electrical and thermal load;
- wherein a first temperature of the aseptic first food product portion is monitored and controlled within the first aseptic surge tank and a second temperature of the aseptic second food product portion is monitored and controlled within the second aseptic surge tank to maintain the lower viscosity within the first aseptic surge tank and the second aseptic surge tank; resulting in the decreased electrical and thermal load;
- wherein the aseptic first food portion is a mousse base comprising approximately 60-65% water, approximately 12-15% sugar alcohol, approximately 11-13% cream, approximately 0.5-0.85% gelatin, approximately 3.8-5% flavoring agents, approximately 1.5-2.5% milk protein concentrate, approximately 0.15-0.25% emulsifying agents, approximately 0.1-0.25% sweetener, and approximately 2-3.3% thickening agent.

* * * * *